US009449514B2

(12) United States Patent
Schunder et al.

(10) Patent No.: US 9,449,514 B2
(45) Date of Patent: Sep. 20, 2016

(54) METHODS AND APPARATUS FOR ADAPTIVE VEHICLE RESPONSE TO AIR QUALITY STATES

(75) Inventors: Mark Schunder, South Lyon, MI (US); Gary Steven Strumolo, Beverly Hills, MI (US); Krishnaswamy Venkatesh Prasad, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 650 days.

(21) Appl. No.: 13/110,393

(22) Filed: May 18, 2011

(65) Prior Publication Data

US 2012/0293315 A1 Nov. 22, 2012

(51) Int. Cl.
*B60Q 1/00* (2006.01)
*G08G 1/0967* (2006.01)

(52) U.S. Cl.
CPC ................................ *G08G 1/096775* (2013.01)

(58) Field of Classification Search
None
See application file for complete search history.

(56) References Cited

U.S. PATENT DOCUMENTS

| | | | | |
|---|---|---|---|---|
| 3,974,350 | A | | 8/1976 | Breed |
| 5,365,516 | A | | 11/1994 | Jandrell |
| 5,410,739 | A | | 4/1995 | Hart |
| 5,653,462 | A | | 8/1997 | Breed et al. |
| 5,748,473 | A | | 5/1998 | Breed et al. |
| 5,829,782 | A | | 11/1998 | Breed et al. |
| 5,845,255 | A | | 12/1998 | Mayaud |
| 5,848,802 | A | | 12/1998 | Breed et al. |
| 5,901,978 | A | | 5/1999 | Breed et al. |
| 6,078,853 | A | * | 6/2000 | Ebner et al. .................... 701/36 |
| 6,128,482 | A | | 10/2000 | Nixon et al. |
| 6,272,411 | B1 | | 8/2001 | Corrado et al. |
| 6,282,475 | B1 | | 8/2001 | Washington |
| 6,330,499 | B1 | | 12/2001 | Chou et al. |
| 6,353,785 | B1 | | 3/2002 | Shuman et al. |
| 6,445,300 | B1 | | 9/2002 | Luman |
| 6,474,683 | B1 | | 11/2002 | Breed et al. |
| 6,602,191 | B2 | | 8/2003 | Quy |
| 6,603,999 | B2 | | 8/2003 | Servaas |
| 6,734,799 | B2 | | 5/2004 | Munch |
| 6,762,684 | B1 | | 7/2004 | Camhi |
| 6,778,672 | B2 | | 8/2004 | Breed et al. |
| 6,793,242 | B2 | | 9/2004 | Breed et al. |
| 6,942,248 | B2 | | 9/2005 | Breed et al. |
| 6,944,536 | B2 | | 9/2005 | Singleton |
| 6,945,060 | B2 | * | 9/2005 | Tomita et al. .................. 62/157 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Firmin Backer
*Assistant Examiner* — Shawna M Kingston
(74) *Attorney, Agent, or Firm* — Jennifer Stec; Brooks Kushman P.C.

(57) ABSTRACT

A computer-implemented method includes connecting to a remote system and requesting data relating to a quality of air level in the vicinity of a known vehicle location. The method further includes receiving data relating to the quality of air level and comparing the data to one or more predetermined threshold levels of tolerance. If the data exceeds at least one threshold level of tolerance an automatic vehicle computing system response is instructed. In this example, the method also includes activating one or more vehicle systems in response to the data exceeding the at least one threshold level of tolerance.

7 Claims, 6 Drawing Sheets

(56) References Cited

U.S. PATENT DOCUMENTS

| | | | |
|---|---|---|---|
| 6,946,966 B2 | 9/2005 | Koenig | |
| 7,019,650 B2 | 3/2006 | Volpi et al. | |
| 7,027,621 B1 | 4/2006 | Prokoski | |
| 7,042,345 B2 | 5/2006 | Ellis | |
| 7,050,897 B2 | 5/2006 | Breed et al. | |
| 7,164,117 B2 | 1/2007 | Breed et al. | |
| 7,266,430 B2 | 9/2007 | Basson et al. | |
| RE39,871 E * | 10/2007 | Skardon | 340/627 |
| 7,301,464 B2 | 11/2007 | Coulter | |
| 7,534,206 B1 | 5/2009 | Lovitt et al. | |
| 7,670,288 B2 | 3/2010 | Sher | |
| 7,680,690 B1 | 3/2010 | Catalano | |
| 7,693,625 B2 | 4/2010 | Bauerle et al. | |
| 7,775,453 B2 | 8/2010 | Hara | |
| 7,792,701 B2 | 9/2010 | Basson et al. | |
| 7,805,224 B2 | 9/2010 | Basson et al. | |
| 8,078,334 B2 | 12/2011 | Goodrich | |
| 8,104,814 B2 | 1/2012 | Sartin et al. | |
| 8,140,358 B1 | 3/2012 | Ling et al. | |
| 8,149,111 B2 | 4/2012 | Monroe | |
| 8,196,694 B2 | 6/2012 | Biondo et al. | |
| 8,229,758 B2 | 7/2012 | Moncrease | |
| 8,350,722 B2 * | 1/2013 | Tewari et al. | 340/905 |
| 2001/0020902 A1 | 9/2001 | Tamura | |
| 2001/0034617 A1 | 10/2001 | Kimata | |
| 2002/0013788 A1 | 1/2002 | Pennell et al. | |
| 2002/0099424 A1 | 7/2002 | Ferek-Petric | |
| 2002/0118112 A1 | 8/2002 | Lang | |
| 2002/0123833 A1 | 9/2002 | Sakurai et al. | |
| 2003/0028792 A1 | 2/2003 | Plow et al. | |
| 2003/0043045 A1 | 3/2003 | Yasushi et al. | |
| 2003/0064748 A1 | 4/2003 | Stulberger et al. | |
| 2003/0065432 A1 | 4/2003 | Shuman et al. | |
| 2003/0208409 A1 | 11/2003 | Mault | |
| 2004/0046666 A1 | 3/2004 | Yasuchi | |
| 2004/0133082 A1 | 7/2004 | Abraham-Fuchs et al. | |
| 2005/0125258 A1 | 6/2005 | Yellin et al. | |
| 2005/0171660 A1 | 8/2005 | Woolford et al. | |
| 2005/0190062 A1 | 9/2005 | Sullivan et al. | |
| 2005/0192830 A1 | 9/2005 | Pugh et al. | |
| 2006/0008058 A1 | 1/2006 | Dai et al. | |
| 2006/0015254 A1 | 1/2006 | Smith | |
| 2006/0022834 A1 | 2/2006 | Rosenfeld et al. | |
| 2006/0059013 A1 | 3/2006 | Lowe | |
| 2006/0161456 A1 | 7/2006 | Baker et al. | |
| 2006/0271394 A1 | 11/2006 | Kelly | |
| 2006/0290516 A1 | 12/2006 | Muehlsteff et al. | |
| 2007/0088624 A1 | 4/2007 | Vaughn et al. | |
| 2007/0233384 A1 * | 10/2007 | Lee | 701/213 |
| 2008/0033644 A1 * | 2/2008 | Bannon | 701/210 |
| 2008/0097552 A1 | 4/2008 | Dicks et al. | |
| 2008/0097917 A1 | 4/2008 | Dicks et al. | |
| 2008/0218376 A1 | 9/2008 | Dicks et al. | |
| 2008/0249386 A1 | 10/2008 | Besterman et al. | |
| 2008/0297336 A1 | 12/2008 | Lee | |
| 2009/0070148 A1 | 3/2009 | Skocic | |
| 2009/0292555 A1 | 11/2009 | Brown | |
| 2010/0218101 A1 * | 8/2010 | O'Shaughnessy | G06Q 10/00 715/733 |
| 2010/0268051 A1 | 10/2010 | Prasad et al. | |
| 2010/0324817 A1 * | 12/2010 | Hansen et al. | 701/210 |
| 2011/0193707 A1 | 8/2011 | Ngo | |
| 2011/0210867 A1 | 9/2011 | Benedikt | |
| 2011/0218839 A1 | 9/2011 | Shamaiengar | |
| 2012/0112915 A1 | 5/2012 | Strumolo | |
| 2012/0166680 A1 | 6/2012 | Masoud et al. | |
| 2012/0171982 A1 | 7/2012 | Schunder et al. | |
| 2012/0173336 A1 | 7/2012 | Strumolo | |
| 2012/0182143 A1 | 7/2012 | Gaines et al. | |
| 2012/0184237 A1 | 7/2012 | Gaines et al. | |
| 2012/0185265 A1 | 7/2012 | Kochhar | |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Medical Procedures/Surgical Procedures What's the Cost?, 1st Health Insurance Quotes,com, printed Oct. 30, 2010.

Google Health, About Google Health, www.healthvault.com, Dec. 20, 2010.

Welcome to Microsoft Healthvault, Heath Vault, www.google.com/health, Dec. 20, 2010.

* cited by examiner

METHODS AND APPARATUS FOR ADAPTIVE VEHICLE RESPONSE TO AIR QUALITY STATES

TECHNICAL FIELD

The illustrative embodiments generally relate to methods and apparatus for adaptive vehicle response to air quality states.

BACKGROUND

Improvements in vehicle computing systems and vehicle technology have made the vehicle infotainment system into a powerful tool for improving the driving experience. Large, in dash navigation displays can provide a driver with directions and even possibly touch-sensitive control of vehicle systems, such as music, HVAC, etc.

Additionally, many existing vehicles may be equipped with the capability to connect to a remote source, such as a server or other remote machine, and interact dynamically with the remote computer. These connections can be made using a wireless LAN connection, by dialing up through a cellular phone wirelessly or wire-connected to the vehicle computing system, through a tablet PC or other BLUETOOTH device with communication capability, etc.

By tapping into remote resources, the capabilities of a vehicle infotainment system can be greatly expanded. Also, by providing services to vehicle users, OEMs can deliver custom, dynamic solutions based on the needs and requests of drivers. These can be adaptively tailored at a remote source, and the individual drivers can access what appear to be customized options designed to enhance their specific driving experience.

Although these systems are adapted and under constant development, many of the resources that are accessible through remote sources have not yet been accessible from and integrated into the vehicle computing systems. Resources that a user might take for granted in an online computing experience can be delivered to the vehicle and integrated in a novel fashion, to advantageously augment the driving experience while at the same time minimize driver distraction.

SUMMARY

In a first illustrative embodiment, a computer-implemented method includes connecting to a remote system and requesting data relating to a quality of air level in the vicinity of a known vehicle location. The illustrative method further includes receiving data relating to the quality of air level and comparing the data to one or more predetermined threshold levels of tolerance. If the data exceeds at least one threshold level of tolerance an automatic vehicle computing system response is instructed. In this example, the method also includes activating one or more vehicle systems in response to the data exceeding the at least one threshold level of tolerance.

In a second illustrative embodiment, a computer implemented method includes comparing data relating to a quality of air level in the vicinity of a known vehicle location to one or more predetermined threshold levels of tolerance. If the data exceeds at least one threshold level of tolerance, a vehicle routing system is instructed to determine if a secondary route to a requested destination exists that avoids at least some portion of an area. In this example, the area, as indicated by the data, is an area where one or more threshold levels of tolerance is exceeded.

This illustrative example also includes receiving data relating to the route and data relating to at least one primary route to the requested destination, wherein the at least one primary route is a route based at least in part on time efficiency. Also, this exemplary method includes comparing a projected time difference between the secondary route and the primary route. The secondary route is presented as a route to be traveled if the projected time difference is below a threshold level of time difference.

In a third illustrative example, a computer-readable storage medium stores instructions that, when executed by a processor of a vehicle computing system, cause the vehicle computing system to execute a method including connecting to a remote system and requesting data relating to a quality of air level in the vicinity of a known vehicle location. The executed, illustrative method also includes receiving data relating to the quality of air level and comparing the data to one or more predetermined threshold levels of tolerance. If the data exceeds at least one threshold level of tolerance an automatic vehicle computing system response is instructed. Also, the illustrative, executed method includes activating one or more vehicle systems in response to the data exceeding the at least one threshold level of tolerance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
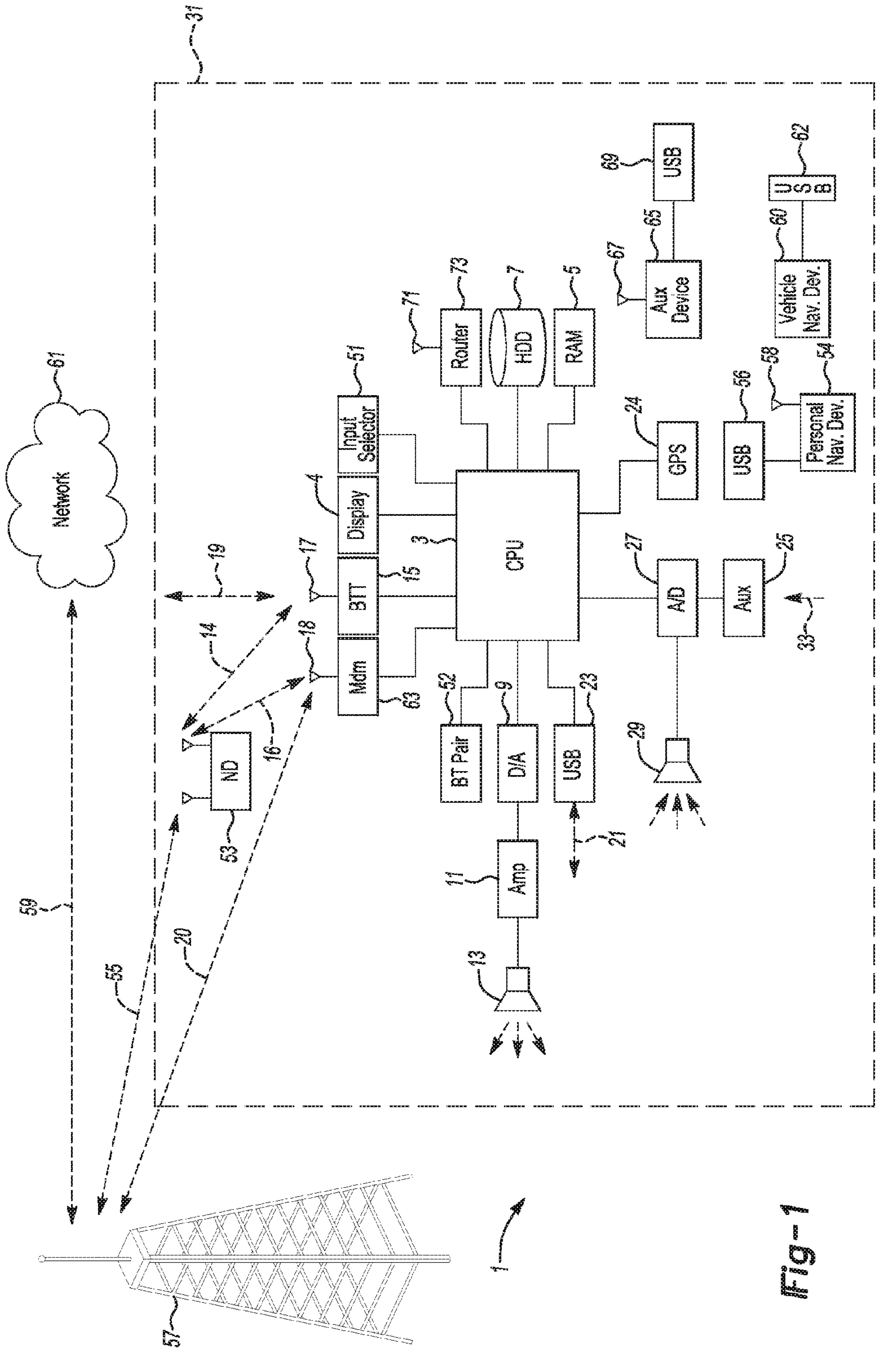
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

While many entertainment-based additions have been made to vehicle computing systems over the last few years, comparatively few options have been added that address some of the more unique needs that drivers may have while on the road. Websites and databases full of up-to-date information abound on the internet, and accessing those remote resources can provide a wealth of usable information to a driver.

On the other hand, driver distraction is becoming a serious problem. Texting while driving and other distractions have even been made illegal in many states, and it is desirable to deliver usable information to a driver in a format that minimizes any distraction from the road. To this end, it may be wise to have a vehicle computing system adaptively react to information to the extent possible. By pre-programming certain behaviors, and by minimizing required driver action, vehicle systems can integrate useful information into the driving experience while keeping the driver and other passengers safe in their travels. At the same time, the driving experience can be greatly improved by the integration of information from a variety of sources.

One problem facing a lot of industrial cities around the world has been air pollution. The result of years of factory and industry output, pollutants can sometimes linger for a long time, reducing the quality of the breathable air in certain areas. When costal and other weather effects are factored in, pockets of low quality air, such as smog, can gather and be noticeably present.

Even in areas where industrial pollution is not prevalent, many naturally occurring air-quality adjusting factors may exist. One of the most prevalent of these is pollen during certain periods of the year. Allergies to pollen may range from mildly irritating to severely dangerous, and in many cases there is little to no forewarning before a person encounters a "polluted" area full of pollen. This could potentially be a problem for a severe allergy suffering driver especially, as runny noses, watery eyes, sneezing and even worse symptoms may prevent the driver from being fully focused on the road.

Drivers who remember to check the internet, for example, before getting into their vehicles, may be able to determine pollen levels and/or where pollen currently is thick in the air. But many times, especially if the driver is rushing to a destination, it may not occur to the driver to check for this data in advance. Other times, if allergies have not yet happened in a season, the driver may simply be ignorant of the fact that allergy inducing weather/seasonal change is upon them. Unfortunately, these drivers often discover this information the hard way, and if nothing else have a more unpleasant experience than they perhaps otherwise could have had they been aware of the air quality conditions.

By integrating adaptive response to air quality into a vehicle computing system, drivers can be given a better chance at avoiding situations which could otherwise cause unpleasant or even potentially life threatening experiences.

Figure 2:
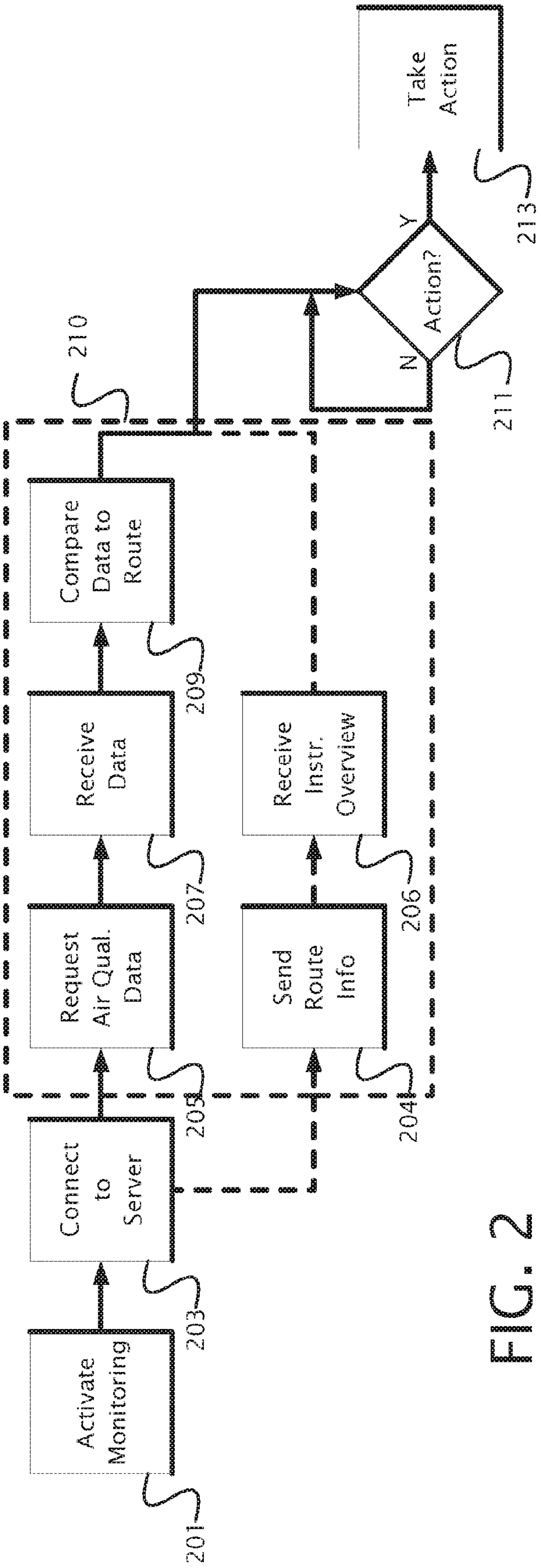
FIG. 2 shows an illustrative process for responsive air quality monitoring.

FIG. 2 shows an illustrative process for responsive air quality monitoring. In this illustrative example, the process first activates air quality monitoring 201. In many of the examples discussed herein, pollen is used as one example of an air contaminant that is monitored, however the illustrative methods and apparatus can be utilized in response to any particular air contaminant, and pollen is used as merely one non-limiting example of such a pollutant.

In this non-limiting example, the process may be activated due to a driver request or it may be, for example, without limitation, activated in response to a detection that an allergy sufferer is present in a vehicle. In at least one example, a vehicle computing system is capable of communicating with wireless passenger devices, such as, but not limited to, health monitoring devices and cellular phones, and communication with a particular device or a profile stored on or in conjunction with a device could indicate the presence of an allergy sufferer in the vehicle. Additionally or alternatively, the communication could indicate the presence of a person wishing to avoid air of certain types, such as, but not limited to, smog-filled air.

Once the process has been activated, communication is established with a remote system, such as, but not limited to, a server, database, etc 203. Communication with the remote system can provide up-to-date data on air quality to a vehicle computing system. In this example, 210 shows two non-limiting examples of the flow a communication with the remote system may take.

In a first example, the vehicle computing system (VCS) may send a request for air quality data along, for example, a known route, or for an immediate area corresponding to the vehicle's location 205. Since the vehicle may have a GPS enabled navigation system, it may be relatively simple to determine the present location of a vehicle. Additionally or alternatively, a route may already be programmed into the navigation system, and thus the VCS can send some specific information to the remote system regarding the area(s) for which data is needed.

Even if a route is not programmed into the system, the system may be able to predict an eventual destination based on, for example, a time of day and/or present vehicle location and/or certain driver. If such prediction is enabled, the system may predictively add a route and use that route information for air quality data gathering.

Once the necessary data, if any, has been sent to the remote system, the vehicle computing system may receive back data responsive to its request 207. This data can then be immediately or gradually (or both) compared to a route to be traveled for incidences of low quality or undesirable air 209.

In a second example, route information is relayed to a remote system 204. Instead of doing the data processing on-board the vehicle, the remote system may take advantage of increased computing power and perform the necessary determinations remotely. In this example, an overview or a set of instructions may be received by the vehicle 206, providing the vehicle computing system with one or more decisions or instructions to be undertaken at particular locations along a route.

In other examples, wirelessly connected devices, such as, but not limited to, smart phones may contain applications or be tapped for processing power in order to analyze the data. Such offboard processing may free the power of the vehicle computing system to handle other tasks while simultaneously analyzing the data for useful results.

When a response to a particular query has been received, in whatever form desired, the process then checks to see if an action is required 211. Non-limiting examples of actions are discussed in more detail with respect to FIGS. 3-6. If an action is required, the action is undertaken by the process as needed 213.

Figure 3:
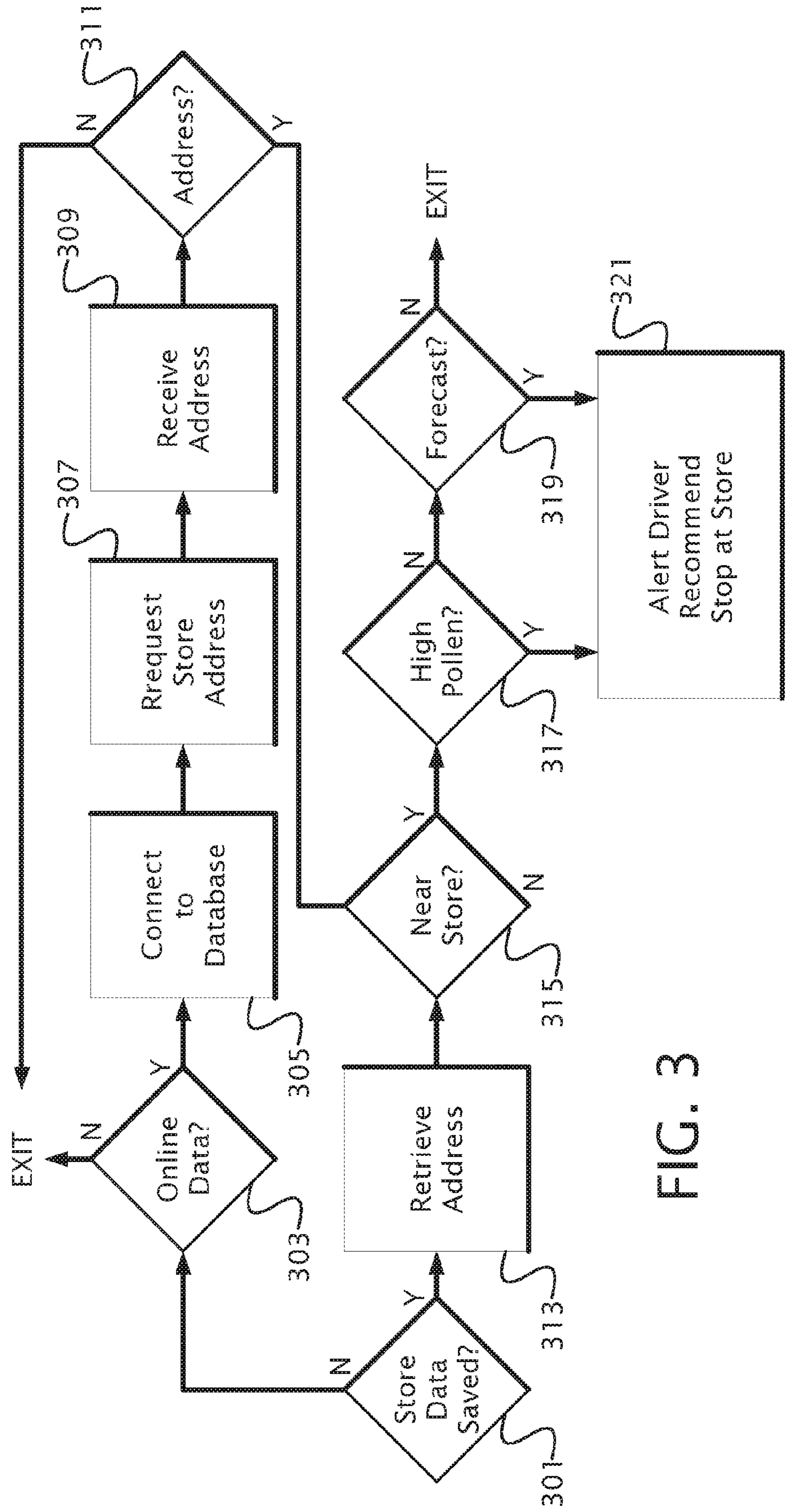
FIG. 3 shows an illustrative process for a vehicle computing system response to air quality data.

FIG. 3 shows an illustrative process for a vehicle computing system response to air quality data. In this illustrative example, the process may route a user to a local store for allergy medication, or inform the user of proximity to a store where that user commonly purchases allergy medication.

This process is an illustrative example of an action that a vehicle computing system may take in response to an escalated air contaminant level, for example. In this embodiment, the process checks to see if there is any pharmacy data stored with respect to a passenger 301. For example, without limitation, the data could be stored in a local memory with a user profile, on a wireless device, or in a remote location accessible by the VCS.

If there is no data present, the process may check to see if an online profile or online data is available 303. For example, without limitation, the process may contact a medical records service to see where a prescription was most recently filled. In this example, the process connects to a database or other information service 305 and requests the address (and possibly other information) relating to a preferred pharmacy or a recently used pharmacy in the vicinity of the vehicle 307.

If an address is available 311, or if an address was discovered at the initial check 301 and retrieved 313, the process may then determine if the vehicle is in a predetermined or user-defined proximity to the pharmacy 315. If the user is in range, the process may also determine, based, for example, without limitation, on received information from a remote source, whether a high pollen level is currently present 317. Additionally or alternatively, the process may check to see if a pollen forecast is predicting a high pollen level along a planned route or in the near future in the vicinity of the vehicle (or user's home address, work address, etc) 319.

If there is a likelihood of encountering allergens, this illustrative process may notify the user that a preferred pharmacy is in the vicinity of the vehicle (or along a planned route) and recommend that the user stop to get medication if needed 321. The recommendation could include, for example, information relating to the levels of pollen or projected levels of pollen.

Figure 4:
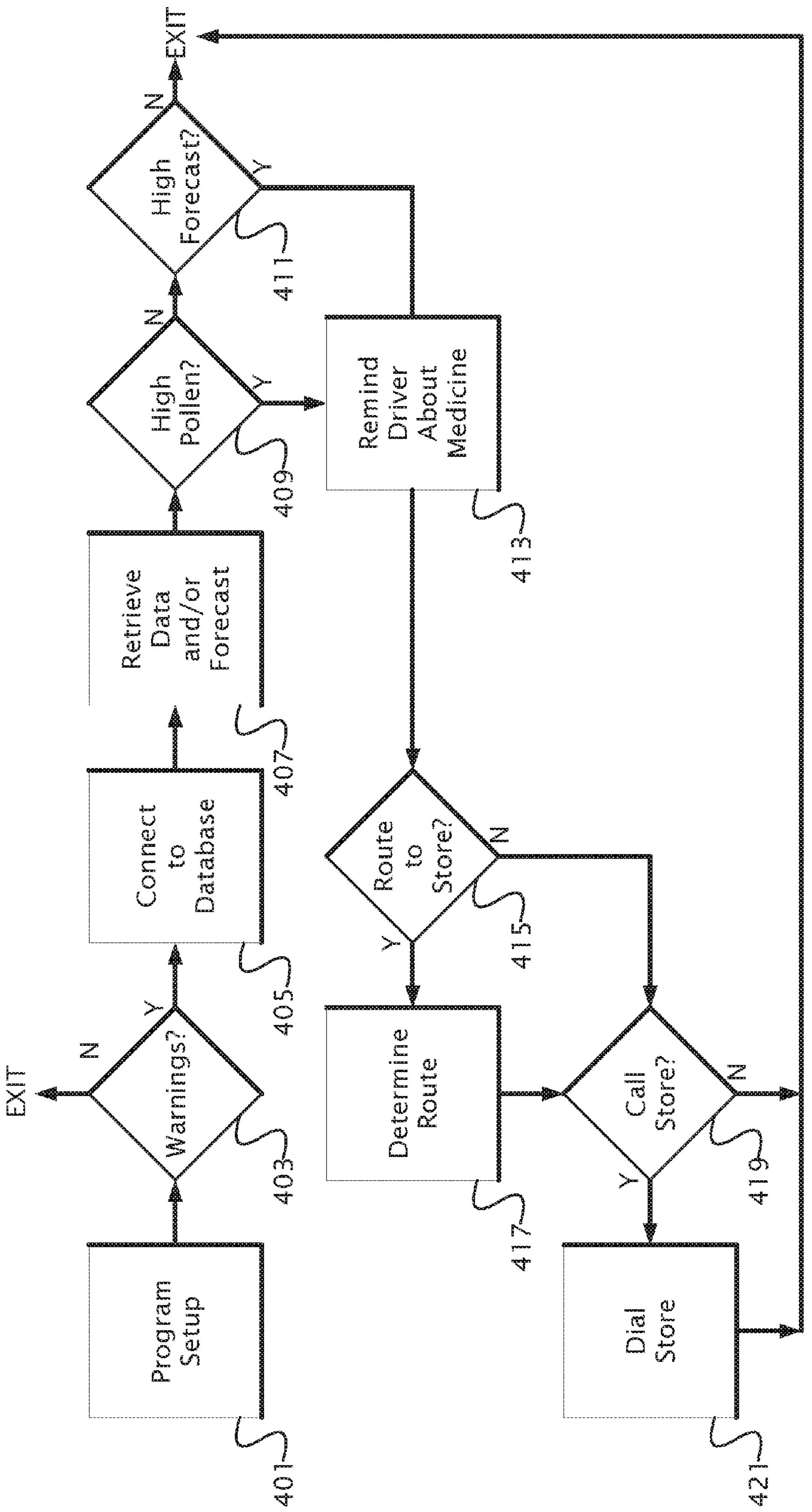
FIG. 4 shows another illustrative process for a vehicle computing system response to air quality data.

FIG. 4 shows another illustrative process for a vehicle computing system response to air quality data. In this illustrative example, the vehicle computing system has just been engaged 401, and the process checks to see if a user-warning feature is enabled 403. For example, a user may desire to be warned whenever a pollen or pollutant count is above a certain threshold.

If the user has enabled warnings (or if warnings are generally enabled), the process may connect to a remote, up-to-date database 405 and request pollutant data and/or a pollutant forecast 407. Again, the data can be location specific, related to a route to be traveled, etc.

If a high pollen (pollutant) level is currently present 409 or likely to be present, the process may present a reminder/warning to a user that medication should be taken if needed 413 to prevent the onset of an allergy attack (or other relevant warning).

Also, in this embodiment, the process asks the driver if a route to a location where medicine can be purchased is desired 415. For example, the driver may have elected a route to work, but may want a location along the way where the driver can stop and obtain medication. The routing engine can re-route the vehicle to a convenient or preferred location 417, and then resume the original route once the location has been reached and travel has been resumed.

In addition to providing route information, the vehicle computing system may be equipped with the ability to place or assist in the placement of a phone call. In this instance, the process also asks the driver if the driver would like to connect to the destination pharmacy/store 419, to place an order for medication, for example.

If the driver desires to connect, the system can dial the store for the driver 421, based on previously obtained information, or the system can query a remote database to obtain a store phone number and then place the call for the driver. In this manner, the driver can begin traveling without having to stop, look up a number, and place a call ahead to the store. Using the capabilities of the VCS, the driver can handle the phone call while enroute and save time and hassle. Further, this helps discourage the driver from distraction which may occur if the driver is manually manipulating a cellular phone to make the call while driving.

Figure 5:
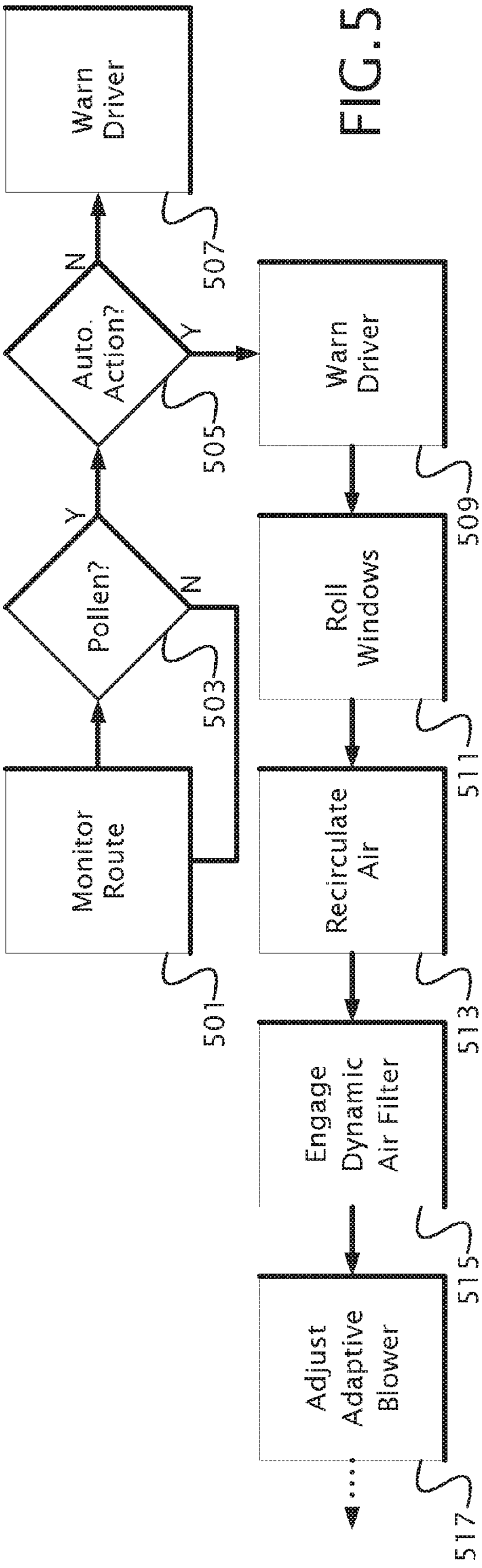
FIG. 5 shows yet a further illustrative process for a vehicle computing system response to air quality data.

FIG. 5 shows yet a further illustrative process for a vehicle computing system response to air quality data. In this illustrative example, the process is actively monitoring a route for an onset of pollen or other pollutants 501.

Monitoring may take several forms. In one non-limiting example, the system may have downloaded data or a forecast relating to a route to be traveled. In this instance, the data may be checked against a current position of the vehicle in order to determine if a high pollutant level is present or projected. In another non-limiting example, the system may be in periodic or constant communication with a remote, up-to-date data source, which may provide a current indication of any pollutant levels.

If a certain pollutant level is projected/approached/determined 503, the process may check to see if there are any automatic actions to be taken with respect to the pollutant and/or level of pollutant 505. For example, in one instance a severe allergy sufferer may desire to be routed around pollutants entirely, whereas another person with more mild allergies may simply desire a warning or a switch to recirculated air.

If there are no automatic actions to be taken, in this example, the process warns the driver of the escalated level of contaminants and takes no further action 507. In this example, the process also issues a warning if action is to be taken 509, which may include information about the contaminant and the action to be taken. This may help prevent the driver from being startled if, for example, vehicle windows are to be automatically closed. The driver may also be given an option to opt out of having the vehicle take the automatic action.

Once sufficient warning has been given, if desired, the vehicle may, for example, without limitation, roll up the windows 511, switch the HVAC system to recirculated air 513, or take any other suitable action including, but not limited to, re-routing the vehicle or providing an alternative route option.

Additionally or alternative, the automatically engaged systems may include, for example, a dynamic air filter. Such an air filter could have its porosity adjusted based on known or projected air quality 515. In another instance, the systems may include an adaptive blower that changes flow rate with changes in air quality 517.

Figure 6:
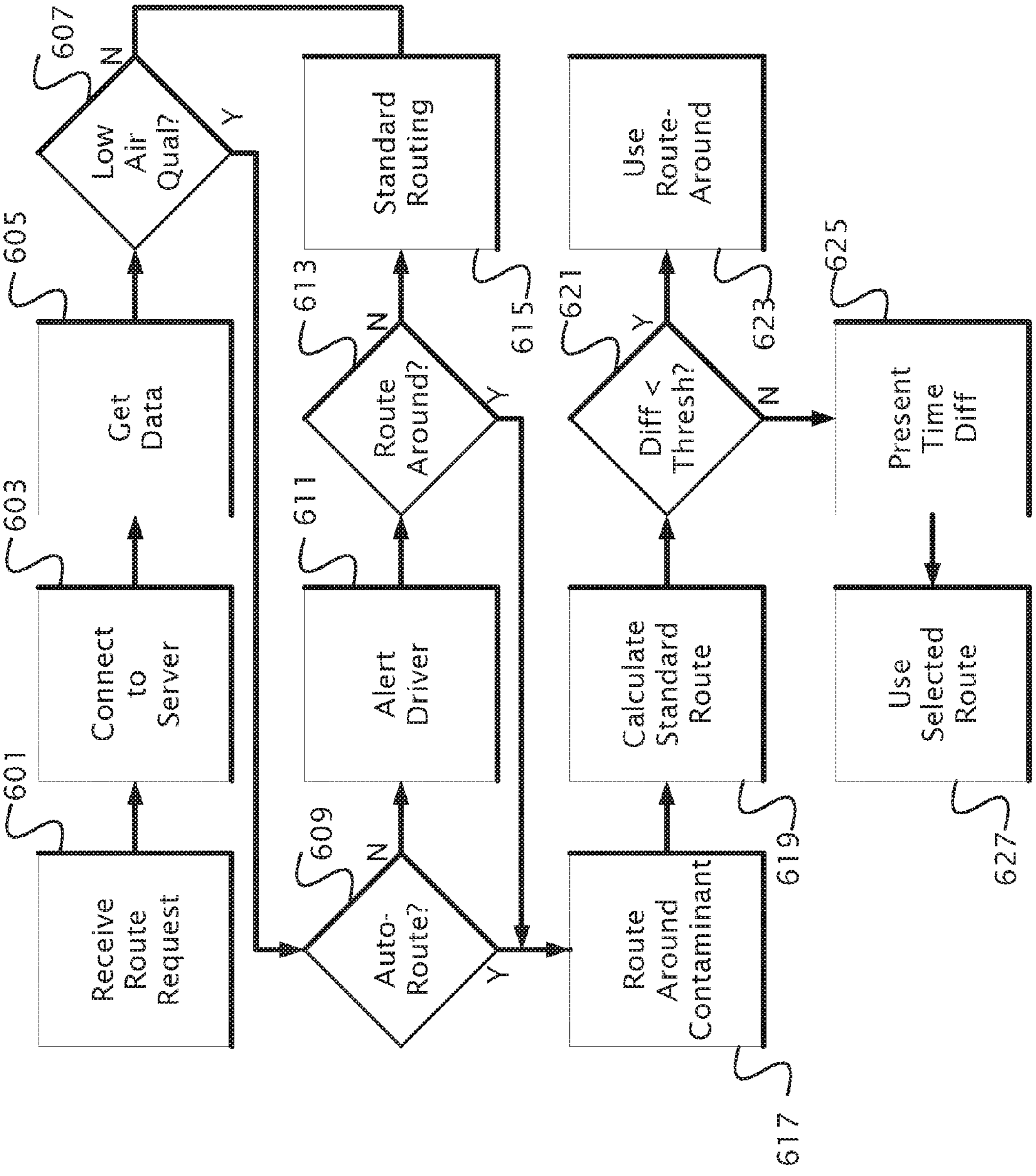
FIG. 6 shows a vehicle routing system response to air quality data.

FIG. 6 shows a vehicle routing system response to air quality data. In this illustrative example, a driver may enter a destination for a trip desired to be taken in the vehicle 601. Responsive to a predetermined setting, driver request, known allergy or for another suitable reason, the VCS may connect to a remote system 603 and obtain data relating to air quality along a route to be traveled 605. Again, this data can be present data or forecasted data. If a low air quality condition is determined to be present or likely to be present 607, the process may be set to automatically route around the condition 609.

In one example, automatic routing may be set if air quality is below a certain threshold (i.e., the driver may always want to avoid certain levels of contaminants). In another example, the automatic routing may always or never be turned on.

If the automatic routing is not enabled or the threshold is not met, the process may warn the driver of the detected or projected contaminant level 611, and provide the driver with the option to determine if a route is available to avoid the contaminants 613. Such a feature may be especially useful on a long journey, if multiple, similarly distanced routes are available to a destination. A driver may not even mind traveling some distance out of the way if high levels of contaminants can be avoided and an allergy attack, for example, can be likely avoided.

If the driver does not want to take an alternative route, the process will proceed with routing according to the appropriate routing paradigm 615. If a route-around is desired or automatically engaged, the process may determine at least one route around the contaminants 617.

In this illustrative example it is assumed that the driver may, at least in certain instances, only desire an alternative route if the route is within a reasonable threshold of a "standard" route (e.g., a direct route). Accordingly, a "standard" route is also determined 619. The standard route is then compared with the route-around to determine if the alternate route is within a tolerable threshold 621. According to this embodiment, the threshold can, for example, without limitation, be predetermined by a setting, made by the driver or a vehicle manufacturer. If the tolerance level is met, the routing process elects the route-around as the acceptable route 623.

If the route is not within the tolerance (or if no tolerance exists), the process may, for example, present a projected time difference between the two routes 625. This can also take into account traffic levels, speed limits, known stopping points, construction, etc. The driver may then have an option to select which route is desired, and the process will continue using the selected route 627.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:

connecting to a remote system and requesting allergen data along a vehicle route; receiving allergen data;

detecting an occupant for whom allergy data is pre-stored and accessible by a vehicle computing system;

comparing the allergen data to known occupant allergies, via a vehicle computing system; and locating and providing directions to a pharmacy in response to a correspondence between the allergen data and the known occupant allergies.

2. The method of claim 1, further comprising activating a vehicle system in response to the allergen data exceeding a tolerance threshold wherein the activated vehicle system is a warning system that alerts passengers of the results of the comparing.

3. The method of claim 2, wherein the warning includes information relating to an air level quality.

4. The method of claim 1, wherein the method further includes providing an option to contact the pharmacy through a vehicle computing system, and, if the option is elected, contacting the pharmacy through the vehicle computing system to allow a passenger to request medication.

5. A non-transitory computer-readable storage medium storing instructions that, when executed by a processor of a vehicle computing system, cause the vehicle computing system to execute the method comprising:

connecting to a remote system and requesting allergen data along a vehicle route; receiving allergen data;

comparing allergen data to stored occupant allergy data; and upon a correspondence between the allergen data and stored occupant allergy data, determining a local pharmacy and providing navigation instructions to the pharmacy.

6. The method of claim 1, further comprising:

accessing an occupant medical record, based on the correspondence between the allergen data and the known occupant allergies;

obtaining a location where an allergy medicine prescription was previously filled; and wherein the pharmacy is the location where the allergy medicine prescription was previously filled.

7. The storage medium of claim 5, wherein the method further comprises:

accessing an occupant medical record, based on the correspondence between the allergen data and the stored occupant allergy data;

obtaining a location where an allergy medicine prescription was previously filled; and wherein the pharmacy is the location where the allergy medicine prescription was previously filled.

* * * * *